United States Patent [19]

Becker et al.

[11] 4,420,693
[45] Dec. 13, 1983

[54] LOAD-CONTROL SYSTEM WITH TWO-CONDUCTOR SUPPLY CIRCUIT

[75] Inventors: Henning Becker; Fritz Jauss, both of Schönaich, Fed. Rep. of Germany

[73] Assignee: Centra-Bürkle GmbH & Co., Schönaich, Fed. Rep. of Germany

[21] Appl. No.: 314,434

[22] Filed: Oct. 23, 1981

[30] Foreign Application Priority Data

Nov. 14, 1980 [DE] Fed. Rep. of Germany ....... 3042947

[51] Int. Cl.³ .................... F23N 5/20; G05D 23/00
[52] U.S. Cl. ...................................... 307/66; 236/47; 236/46 R; 307/117; 307/141
[58] Field of Search ................. 307/117, 127, 132 E, 307/132 EA, 132 T, 66, 141; 236/46 A, 46 B, 46 R, 47; 363/60, 61; 340/593, 599

[56] References Cited

U.S. PATENT DOCUMENTS

| | | | |
|---|---|---|---|
| 3,948,441 | 4/1976 | Perkins et al. | 307/66 X |
| 4,029,937 | 6/1977 | Russell | 307/117 X |
| 4,236,084 | 11/1980 | Gingras | 307/117 X |
| 4,268,899 | 5/1981 | Rokas | 363/61 |
| 4,344,071 | 8/1982 | Allen | 307/117 X |
| 4,365,167 | 12/1982 | Weimer et al. | 236/47 |

Primary Examiner—Elliot A. Goldberg
Assistant Examiner—D. Jennings
Attorney, Agent, or Firm—Karl F. Ross

[57] ABSTRACT

A system for the control of a load such as a heating or cooling plant in response to changes in an external parameter, specifically ambient temperature, comprises a loop circuit with two conductors connected at an input end across a power supply and at an output end across a switching network, the load being inserted in one of these conductors. A high-impedance voltage multiplier connected across these conductors downstream of the load, in parallel with the switching network, supplies the necessary operating voltage to a parameter sensor such as a thermostat even when that network is in a low-impedance state so as to draw a maximum load current. The switching network may include a voltage clamp provided with a source of reference potential, e.g. a primary battery, which upon failure of the normal power supply can act as a standby supply insuring continued operation of a timer serving for a periodic switchover between different temperature thresholds for the thermostat.

19 Claims, 4 Drawing Figures

LOAD-CONTROL SYSTEM WITH TWO-CONDUCTOR SUPPLY CIRCUIT

FIELD OF THE INVENTION

Our present invention relates to a load-control system of the type wherein a two-conductor loop circuit energizes a load in one of the conductors with current from a power supply connected across the input ends of the conductors, their output ends being connected across a control element whose impedance is variable in response to changes of an external parameter (e.g. ambient temperature).

BACKGROUND OF THE INVENTION

Such systems are used, for example, in combination with heating or cooling plants whose active equipment is to be switched on and off by a parameter sensor, specifically a thermostat, coupled to the control element which for this purpose may be simply a binary switch. In the low-impedance state of this control element, i.e. when the switch is closed, the load is traversed by a large current establishing one operating condition, as by opening a solenoid valve in a conduit through which fuel is fed to an oil burner or the like. In the high-impedance state, i.e. with the switch open, the current is substantially or completely cut off with resulting changeover to the alternate operating condition, namely closure of the solenoid valve in the aforementioned instance. The loads here contemplated include a wide variety of electromagnetic and other devices, among them thermoelements such as bimetallic switches juxtaposed with heating wires traversed by the loop current; lighting fixtures are a further example.

A thermostatic control system for a heating or cooling plant, using only two wires, is described in U.S. Pat. No. 3,948,441. That patent also shows a timer serving for the periodic switchover of the temperature setting of a thermostat to establish different thresholds for daytime and night-time operation, the timer having a motor driven by an accumulator which can be recharged by the current circulating through the loop in the open-circuited state of the thermostat contacts connected thereacross. The thermostats shown in the patent are bimetallic strips in series with adjustable resistors; upon closure of its contacts, such a strip is traversed by virtually the full load circuit.

Even a rechargeable battery or accumulator will not ensure the continued operation of a timer motor when the thermostat contacts have been held closed for an extended period during which no significant charging current could flow. Moreover, the passage of the load current through these contacts tends to subject the thermostat to additional heat which makes the maintenance of a desired mean room temperature more difficult.

OBJECTS OF THE INVENTION

An object of our present invention, therefore, is to provide a control system of the type referred to having means for enabling the energization of a thermostat or other parameter sensor by only a small fraction of the load current in the low-impedance state of a control element while maintaining such energization also in the high-impedance state of that element, all without the need for additional conductors connecting the sensor to the associated power supply.

Another object is to provide means in this kind of system for ensuring the continued operation of a device such as a timer, at least in the absence of a power failure, without the need for a separate battery or accumulator.

A further object, related to the preceding one, is to provide means for automatically replacing the main current supply by a standby source in the event of a power failure, thereby maintaining the operation of an interruption-sensitive component such as a timer.

SUMMARY OF THE INVENTION

A system according to our invention, wherein a two-conductor loop circuit connected between a power supply and a variable-impedance control element has a load inserted in one of its conductors, comprises feed means including a high-impedance voltage intensifier connected across the loop conductors downstream of the load in parallel with the control element for keeping sensing means responsive to an external parameter operational in both a low-impedance and a high-impedance state into which the control element is alternately switchable by the sensing means. The terms "high-impedance state" and "low-impedance state" are to be understood in a relative sense and do not necessarily imply a binay mode of operation; thus, the control element could also have one or more states in which its impedance assumes intermediate values, that impedance being possibly variable over a continuous range. Moreover, the two conductors need not be a pair of wires; one of them, for instance, may be formed at least partly by ground.

In the more specific instance here contemplated, in which the load is a device controlling the operation of equipment such as a heating or cooling plant designed to maintain a predetermined mean temperature in a closed space, the sensing means comprises a thermosensitive element in that space advantageously inserted in one arm of an impedance bridge whose input diagonal is connected across the output of the voltage intensifier while its output diagonal is connected by way of a differential amplifier across an input circuit of a transistor or the like serving as biasing means for a semiconductor component forming part of the switchable control element. A second thermosensitive element in another bridge arm may be juxtaposed with a heating resistor connected across the loop conductors, in parallel with the voltage intensifier, to provide thermal feedback for stabilizing the operation of the switching network formed by the impedance bridge and the differential amplifier.

Pursuant to a further feature or our invention, the input diagonal of the impedance bridge is connected across the voltage-intensifier output in series with a voltage clamp, e.g. a pair of transistors arranged in a Darlington configuration, which is provided with a source of reference potential that may be a Zener diode but could also be a separate battery, preferably by the primary or nonrechargeable kind. Such a battery may also serve as a standby source for the continuing energization of an interruption-sensitive component in the case of failure of the main power supply, specifically a timer having switchover contacts for modifying the temperature threshold of the switching network in a preselected rhythm as known per se from the aforementioned U.S. Pat. No. 3,948,441.

When the power supply is an alternating-current source, the voltage intensifier could be a step-up transformer designed to have the necessary high input impedance. With a switching network adapted to operate on direct current, a rectifier would have to be inserted between that network and the secondary of the transformer. We therefore prefer to use a voltage multiplier also having a rectifying function, advantageously a voltage-doubling rectifier bridge with two relatively inverted diodes in one pair and with two capacitors in another pair of adjoining arms. The 2:1 step-up ratio provided by such a circuit is sufficient in practically all instances to ensure proper energization of a switching network of the type described even during near-short-circuiting of the loop downstream of the load by a thyristor or other semiconductor component acting as the switchable control element.

BRIEF DESCRIPTION OF THE DRAWING

The above and other features of our invention will now be described in detail with reference to the accompanying drawing in which.

SPECIFIC DESCRIPTION

Figure 1:
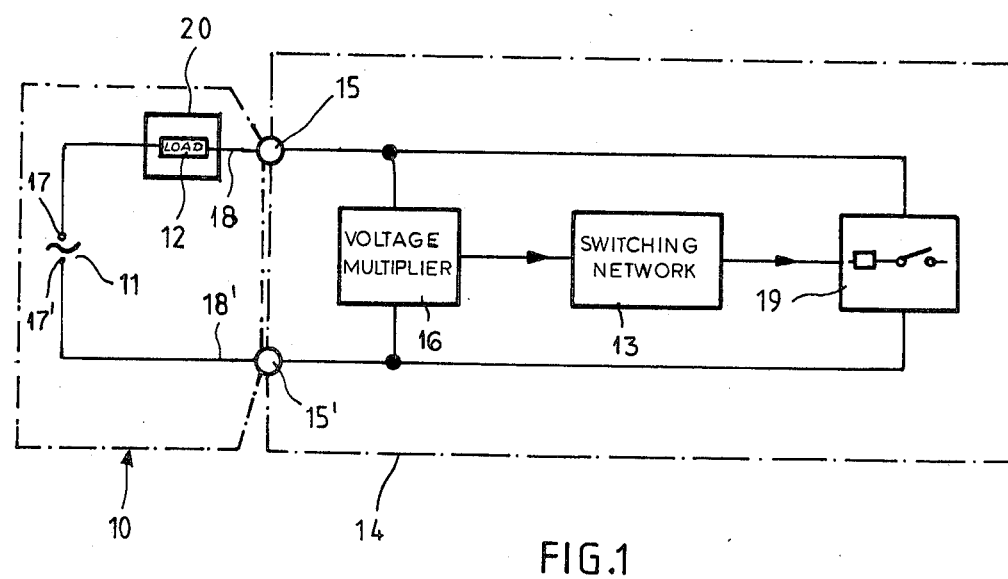
FIG. 1 is a block diagram of a load-control system embodying out invention.

In FIG. 1 we have shown two modulator units 10 and 14 which are electrically interconnected by a pair of junctions 15 and 15', e.g. plug-and-jack couplings. Unit 10 comprises two conductors 18 and 18' with input ends 17, 17' connected across an a-c power supply 11 such as a step-down transformer plugged into the usual utility mains. A load 12 inserted in conductor 18 may be an impedance element, specifically a solenoid coil, forming part of an electromagnetic valve 20 which controls the operation of a heating or cooling plant not further illustrated. Extensions of these conductors within unit 14 form a loop circuit terminated by a control element 19 schematically shown in this Figure as an on/off switch. A voltage intensifier 16, with inputs connected across the loop conductors downstream of load 12, energizes a switching network 13 which in turn operates the control element 19 for opening or closing the loop circuit in response to changes of an external parameter—especially ambient temperature—detected by a sensor in that network. Control element 19 is of such nature that a residual voltage drop is maintained thereacross in its closed state.

Figure 2:
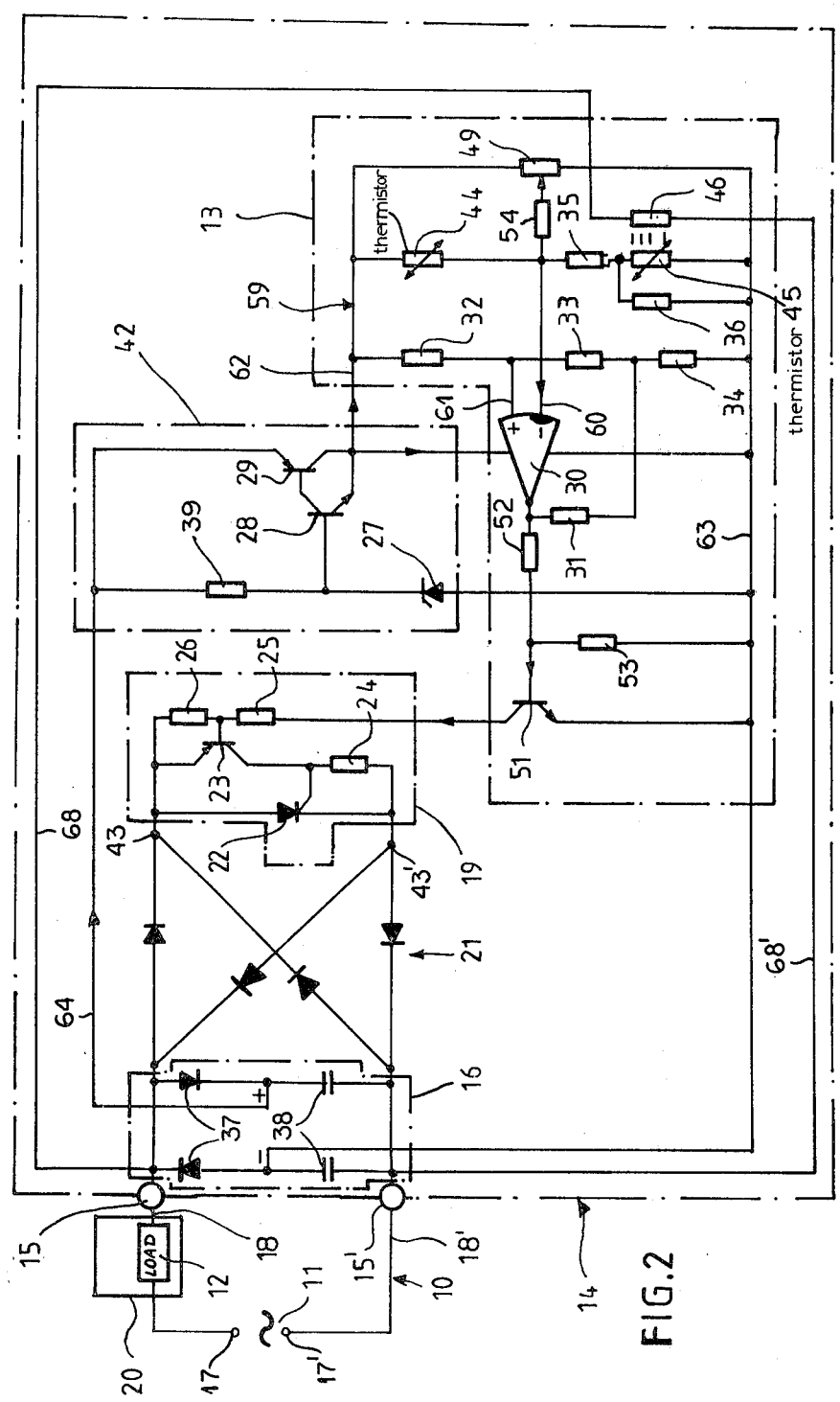
FIGS. 2, 3 and 4 are more detailed circuit diagrams of a system as shown in FIG. 1.

FIG. 2 gives details of unit 14 of FIG. 1 in accordance with one embodiment of our invention. Connected across the loop circuit formed by extensions of conductors 18 and 18' is a voltage doubler 16 in the form of a rectifier bridge with a pair of relatively inverted diodes 37 in two adjoining arms connected to junction 15 and with a pair of capacitors 38 in two adjoining arms connected to junction 15'. A diode bridge 21 is inserted as a full-wave rectifier in the loop circuit downstreams of bridge 16 and has output terminals 43, 43' connected across the control element 19. This control element is shown to comprise a thyristor 22 and a series combination of a PNP transistor 23 and a collector resistor 24 in parallel therewith, the gate of the thyristor being tied to the collector of transistor 23.

Two supply lines or bus bars 63 and 64, respectively connected to the negative and positive output terminals of bridge 16, carry d-c potentials differing by substantially twice the amplitude of the alternating voltage appearing between junctions 15 and 15', that amplitude being determined by the anode/cathode resistance of thyristor 22 when it is fired upon saturation of control transistor 23. The base of that transistor is biased by a voltage divider 25, 26 lying in series with an NPN transistor 51 between terminal 43 and bus bar 63, the latter transistor being part of switching network 13. The base/emitter circuit of transistor 51 is bridged by a resistor 53 which together with another resistor 52 forms a further voltage divider between the negative bus bar 63 and the output of a differential amplifier 30 which is connected in a trigger circuit including resistors 31–34 providing positive feedback. Resistor 32, on the one hand, and resistors 33 and 34, on the other hand, constitute respective arms of an impedance bridge 59 which has a third arm formed by a thermistor 44 and a fourth arms including two series resistors 35, 36 and a thermistor 45 in parallel with resistor 36. The input diagonal of bridge 59 is tied to bus bar 63 and to an output lead 62 of a clamping circuit 42 which comprises a resistor 39 in series with a Zener diode 27, connected across bus bars 63, 64, and two complementary transistors 28 (NPN) and 29 (PNP) joined to each other in Darlington configuration to act as a power amplifier. Lead 62 is tied to the emitter of transistor 28 and to the collector of transistor 29 while the emitter of the latter transistor is joined to lead 64 and the base of transistor 28 is connected to the junction of resistor 39 with Zener diode 27. Lines 62 and 63 also supply operating current to amplifier 30 whose switching hysteresis is determined by a voltage divider consisting of resistors 31 and 34.

The output diagonal of bridge 59, which along with amplifier 30 also forms part of switching network 13, is connected by a lead 60 to an inverting input and by a lead 61 to a non-inverting input of that amplifier. Lead 61 extends from the junction of bridge arms 32 and 33, 34 whereas lead 60 is connected to the junction of thermistor 44 with resistor 35. Lead 60 is also connected through a resistor 54 to a tap of a potentiometer 49 which lies in parallel with the input diagonal of the bridge.

The two thermistors 44 and 45 are assumed to be of the directly heated type with a negative thermal coefficient of resistance, i.e. with a conductance increasing at higher temperature. Thermistor 45 is exposed to the same ambient temperature as thermistor 44 but has a considerably smaller effect upon the bridge balance by reason of the associated resistors 35 and 36. A high-ohmic heating resistor 46 confronting the thermistor 45 is connected across the loop conductors of the load circuit by way of two leads 68 and 68' branching off the input diagonal of voltage-doubling bridge 16, thereby providing thermal feedback designed to stabilize the operation of switching network 13 as more fully described hereinafter.

In a specific instance, source 11 may have an output voltage of 24 V which in the open-circuited state of the loop (with thyristor 22 and transistor 23 cut off) appears almost undiminished at junctions 15, 15' by reason of the high input impedance of bridge 16 and the high-ohmic character of heating resistor 46. The d-c voltage differences between bus bars 63 and 64 is therefore substantially twice that value, yet the clamping circuit 42 limits the potential of the input lead 62 of bridge 59 to a relatively low value of, say, about 3 V. When the loop conductors 18, 18' are almost short-circuited downstream of load 12 by the thyristor 22, the output voltage of bridge 16 is still sufficient to maintain approximately the same potential on lead 62.

When the equipment controlled by valve 20 is a heating plant, potentiometer 49 is adjusted to set the temperature below which the load current is to be increased by the thermostatic action of bridge 59 in order to set an oil burner or the like in operation. With room temperatures above that point thermistors 44 and 45 have a relatively low resistance; since the former predominates, the potential of lead 60 is high enough to cut off the amplifier 30 and with it the transistors 51 and 23. With transistor 23 blocked, thyristor 22—if previously conducting—is quenched by the pulsations of the raw-rectified current traversing the bridge 21. Load 12 is thus virtually de-energized, except for the flow of a certain heating current traversing the resistor 46. As a result of this current flow, the resistance of the bridge arm including the thermistor 45 is lowered to that switching network 13 cuts in at an ambient-temperature threshold which is somewhat higher than what it would be if that thermistor were replaced by a substantially temperature-insensitive resistor.

When the room temperature drops below this cut-in point, the increased resistance of thermistor 44 further lowers the potential of lead 60 so that amplifier 30 conducts and flips the switching network 13 into its alternate state. Thermistor 51 saturates along with transistor 23 which causes thyristor 22 to fire. Load 12 is now actuated by the increased loop current to set the heating equipment in operation; the positive feedback via resistors 31 and 34 raises the potential of lead 61 whereby the cutout point of network 13 is raised above its cut-in point to prevent hunting. The flow of heating current through resistor 46 is virtually terminated at this stage so that the resistance of thermistor 45 increases; consequently, the thermal feedback via heating resistor 46 partly offsets the switching hysteresis of the trigger circuit including the amplifier 30.

The diode bridge 21 could be omitted if the thyristor 22 and the junction-type transistor 23 were replaced by bidirectional components such as a triac and a field-effect transistor, respectively.

The system of FIG. 2 (as well as its modifications described hereinafter with reference to FIGS. 3 and 4) can, of course, also be used with thermistor 44 replaced by an impedance element responsive to some other parameter to be monitored. In such a case the thermal feedback via thermistor 45 and resistor 46 may be omitted or adapted to that parameter.

Figure 3:
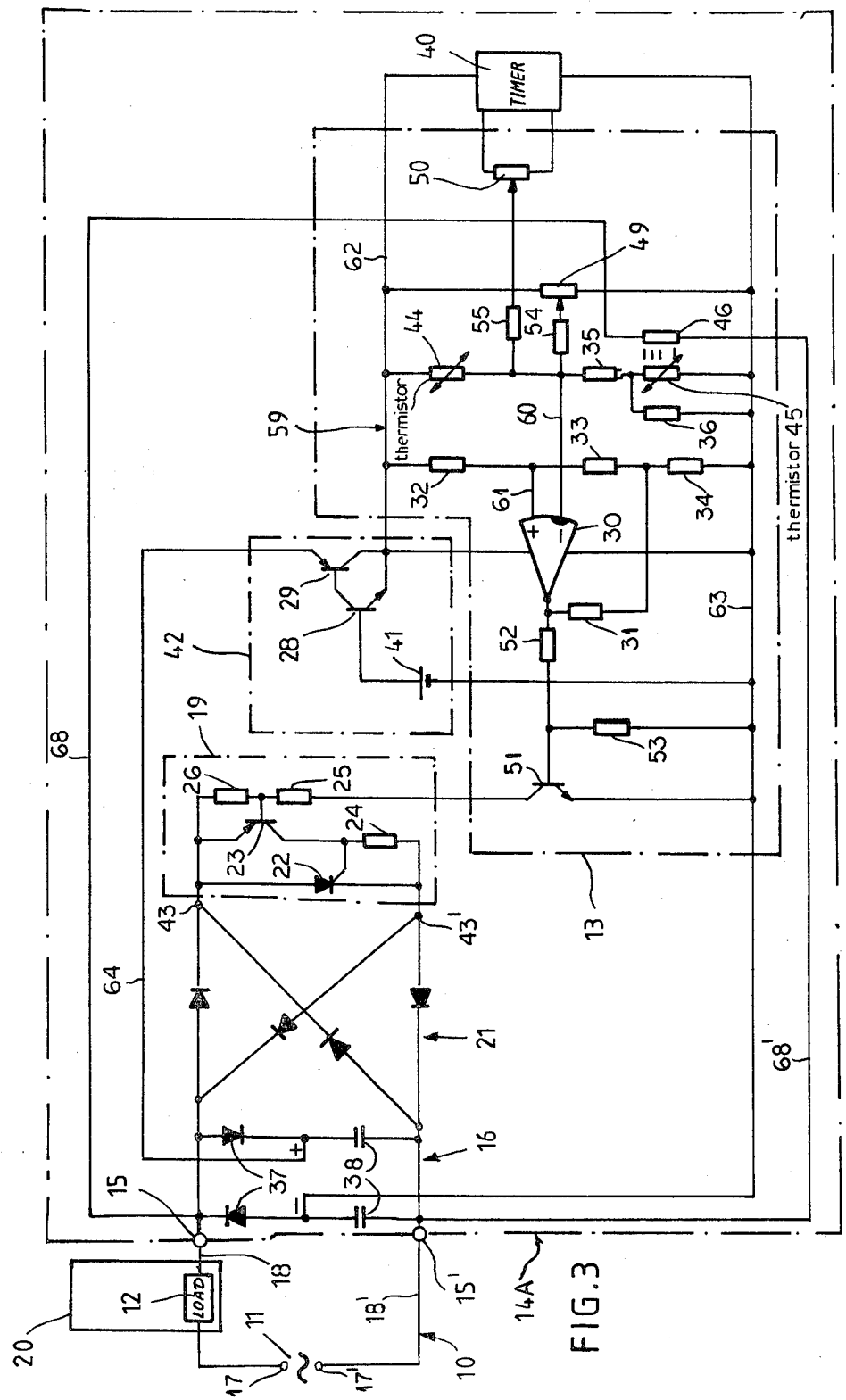

The modified load-control unit 14A shown in FIG. 3 differs from unit 14 of FIG. 2 in two respects. On the one hand, the source of reference voltage 27, 39 has been replaced by a battery 41 which is preferably of the inexpensive primary type and biases the base of the first-stage Darlington transistor 28 to a potential drawing from the second-stage transistor 29 a base current which, as in the preceding embodiment, gives rise under all operating conditions to a collector current on lead 62 sufficient to energize all components of switching network 13. Secondly, there is provided a timer 40 whose nonillustrated motor connected across lines 62, 63 drives a cam shaft periodically opening and closing—e.g. during a diurnal or seasonal cycle—a pair of contacts 69, 69' (FIG. 4) by which an additional potentiometer 50 is connected across these same leads in parallel with potentiometer 49. Output lead 60 of bridge 59 is connected to a tap of potentiometer 50 via a resistor 55 to establish another switchover threshold when the timer contacts are closed.

If power supply 11 should fail or be disconnected from voltage doubler 16 for any reason, transistor 28 will act as a diode allowing battery 41 to keep the timer motor operating until the defect can be remedied. Battery 41, which could consist of one or more cells, normally does not deliver a significant discharge current and thus can have a service life of many years. If desired, however, that battery could be replaced by an accumulator connected to be recharged from bridge 16 during periods in which its output voltage is high.

Figure 4:
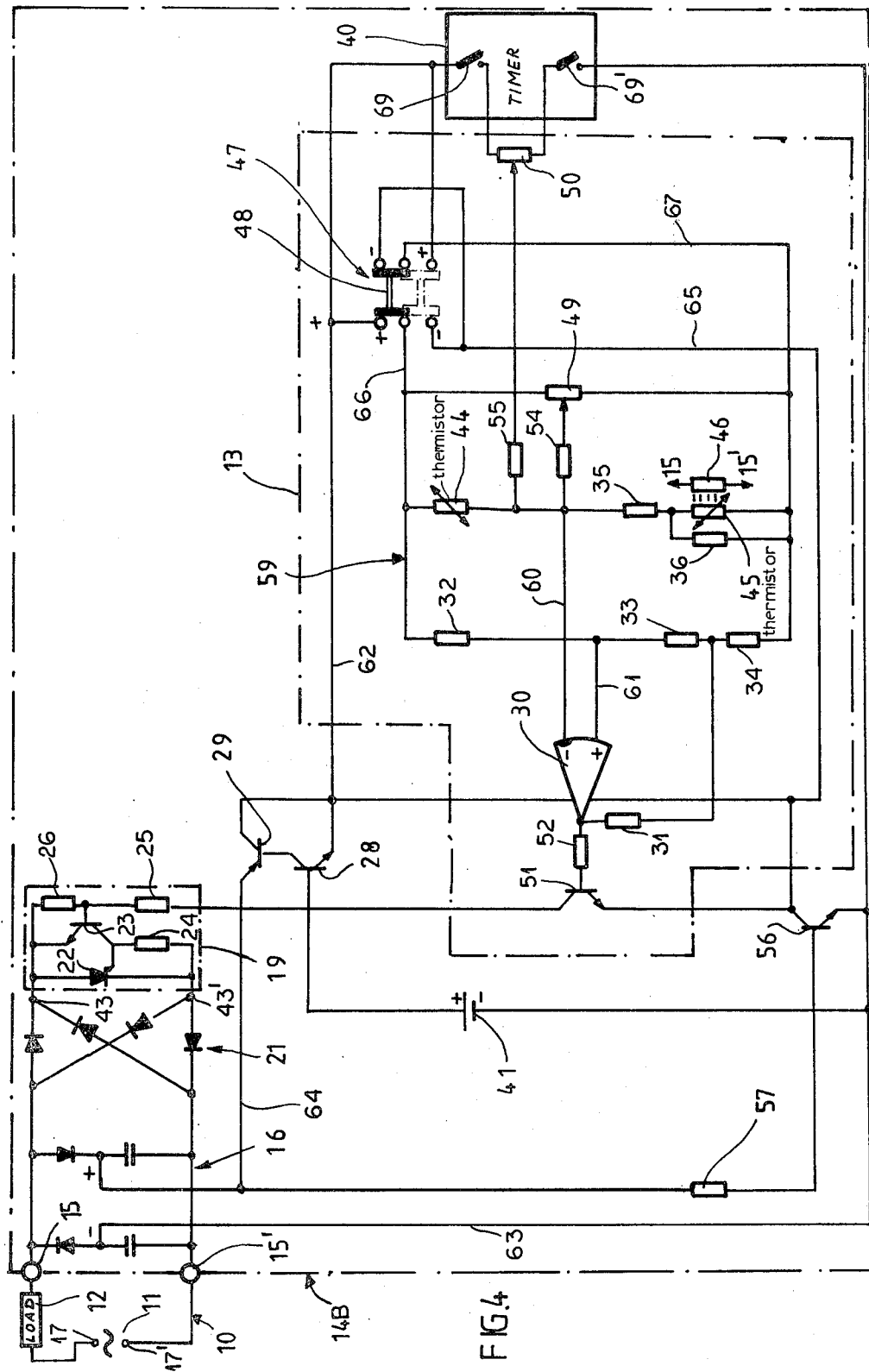

In FIG. 4 we have illustrated another modified unit 14B including an ancillary NPN transistor 56 connected between terminal 43 and negative bus bar 63 in series with transistor 51 and voltage divider 25, 26. The collector of transistor 56, joined to the emitter of transistor 51, is connected to a lead 65 which replaces bus bar 63 as a supply line for amplifier 30; the base of transistor 56 is connected to positive bus bar 64 by way of a resistor 57. Leads 62 and 65 terminate at respective pairs of bank contacts of a reversing switch 47 which has a third pair of bank contacts connected via a pair of leads 66, 67 across the input diagonal of thermostatic bridge 59. An armature 48 of switch 47 connects in its illustrated full-line position the leads 62 and 65 to leads 66 and 67, respectively; in the alternate position of that armature, indicated in phantom lines, these conditions are interchanged. The circuitry is otherwise similar to that of FIG. 3, except for the omission of resistor 53.

The load 12 shown in FIG. 4 is assumed to control the operation on an installation, such as a heat pump, which can be alternately used for heating during the cold season and for cooling during the warm season. With the full-line position of switch 47, used when the system is in its heating mode, the operation is the same as in the preceding embodiment; in the case of a power failure, however, the cutoff of transistor 56 disconnects the lead 65 from negative bus bar 63 so that bridge 59 and amplifier 30 are open-circuited and do not draw current from the battery 41 acting as a standby power supply. This is also the case in the alternate position of switch 47 into which its armature 48 is moved when the system is to be operated in its cooling mode. In that instance, thermistor 44 cuts in the switching network 13 when a relatively high room temperature, corresponding to the threshold selected with the aid of potentiometer 49 (and possibly modified by potentiometer 50), reduces the potential of lead 60 to the desired value. With amplifier 30 conducting, regenerative feedback is again provided as part of its output current passes through resistors 31, 33 and 32 to raise the potential of lead 61 with resulting lowering of the cutout point with references to the cut-in point. The re-energization of heating resistor 46 after the cutout, however, raises the potential of lead 60 so that the thermal feedback in this case supplements the switching hysteresis of amplifier 30 instead of counteracting it as in the heating mode. It will be noted, on the other hand, that the connection of timer 40 between lines 62 and 63 is unaffected by the position of switch 47 so that its effect upon the bias of amplifier 30 remains unaltered; thus, a setting of that potentiometer lowering the threshold temperature in the heating mode will raise the threshold temperature in the cooling mode, in a manner consistent with the requirements for off-hour operation in both instances.

As will be apparent from the foregoing description, we can achieve a desired switching hysteresis for both modes of operation by a suitable choice of biasing resistors 31-34 and of a thermal-feedback effect. It is even possible to use thermal feedback alone in order to minimize hunting; thus, for example, a similar hysteresis in both positions of the polarity-reversing switch 47 can be established by inserting the thermistor 45 and associated resistors in a circuit branch between leads 61 and 65 so that the noninverting input of amplifier 30 is invariably driven more positive upon the disappearance of heating current. We could also replace the high-ohmic heating resistor 46 by a low-ohmic resistor connected in series with load 12 to modify the resistance of one of the bridge arms when the load current is high.

We claim:

1. A load-control system responsive to variations in an external parameter, comprising:
   a diode bridge connected across a variable-impedance control element;
   a loop circuit including a pair of conductors with input ends connected across a power supply in the form of an alternating-current source and with output ends connected across said diode bridge;
   a load inserted in one of said conductors between said input and output ends;
   sensing means coupled to said control element for switching same between a low-impedance state and a high-impedance state, respectively corresponding to a high and a low load current, in response to predetermined changes in said external parameter; and
   feed means including a voltage-doubling rectifier bridge connected across said output ends between said load and said diode bridge for keeping said sensing means operational even in said low-impedance state of said control element, said rectifier bridge having a first pair of adjoining arms with two relatively inverted diodes connected to one of said output ends and having a second pair of adjoining arms with two capacitors connected to the other of said output ends, said feed means further including two direct-current supply leads connected to respective junctions of said first pair of arms with said second pair of arms.

2. A system for controlling the operation of equipment designed to maintain a predetermined mean temperature in a closed space, comprising:
   an impedance bridge having an input diagonal and an output diagonal;
   a differential amplifier with inputs connected across said output diagonal;
   a thermosensitive element inserted in one arm of said impedance bridge and located in the closed space whose temperature is to be maintained;
   a variable-impedance semiconductor component;
   a loop circuit including a pair of conductors with input ends connected across a power supply and with output ends connected across said semiconductor component;
   an equipment-controlling device inserted in one of said conductors between said input and output ends; and
   a high-impedance voltage intensifier connected across said conductors downstream of said device in parallel with said semiconductor component, the input diagonal of said impedance bridge being connected across an output of said voltage intensifier, and semiconductor component being provided with biasing means having an input circuit connected to an output of said differential amplifier for establishing a predetermined temperature threshold at which the conductive state of said semiconductor component is significantly altered by said biasing means with resulting modification of a load current traversing said device, said voltage intensifier keeping said thermosensitive element operational even in a low-impedance state of said semiconductor component.

3. A system as defined in claim 2 wherein said thermosensitive element is a directly heated thermistor with a negative thermal coefficient of resistance.

4. A system as defined in claim 2 or 3 wherein said power supply is an alternating-current source, said voltage intensifier comprising a voltage-doubling rectifier bridge with two relatively inverted diodes in one pair and with two capacitors in another pair of adjoining arms.

5. A system as defined in claim 4 wherein said energizing circuit includes a diode bridge inserted in said conductors between said rectifier bridge and said control element.

6. A system as defined in claim 1 wherein said control element includes a semiconductor component provided with biasing means switchable by said sensing means.

7. A system as defined in claim 6 wherein said load is a device controlling the operation of equipment designed to maintain a predetermined mean temperature in a closed space, said sensing means comprising a thermosensitive element in said space inserted in one arm of an impedance bridge having an input diagonal connected across an output of said voltage intensifier, said impedance bridge having an output diagonal connected via a differential amplifier across an input circuit of said biasing means for establishing a predetermined temperature threshold at which the conductive state of said component is significantly altered by said biasing means.

8. A system as defined in claim 2, 3 or 7 wherein said biasing means comprises a transistor with a base and an emitter forming part of said input circuit.

9. A system as defined in claim 2, 3 or 7 wherein said semiconductor component is a transistor connected to a thyristor for firing same upon being driven to saturation by said biasing means.

10. A system as defined in claim 2, 3 or 7 further comprising thermal-feedback means including a heating resistor connected across said conductors in parallel with said voltage intensifier and a second thermosensitive element in another arm of said impedance bridge juxtaposed with said heating resistor.

11. A system as defined in claim 2, 3 or 7 further comprising voltage-clamping means provided with a source of reference potential and connected in series with said input diagonal across the output of said voltage intensifier.

12. A system as defined in claim 9 wherein said voltage-clamping means comprises a transistor with a base connected to said source of reference potential and with an emitter connected to a corner of said input diagonal.

13. A system as defined in claim 12 wherein said transistor is part of a Darlington pair.

14. A system as defined in claim 12 wherein said source of reference potential as a Zener diode forming part of a voltage divider connected across the output of said voltage intensifier.

15. A system as defined in claim 12 wherein said source of reference potential is a terminal of a battery having another terminal connected to the opposite corner of said input diagonal.

16. A system as defined in claim 15, further comprising switchover means including a timer connected to said impedance bridge for modifying said temperature threshold in a preselected rhythm, said timer having an operating circuit connected in parallel with said input diagonal for emergency energization by said battery via the base-emitter path of said transistor upon failure of said power supply.

17. A system as defined in claim 16 wherein said differential amplifier has an energizing circuit connected across said input diagonal, further comprising electronic switch means controllable by said voltage intensifier for disconnecting said input diagonal and said energizing circuit from said operating circuit and said battery upon failure of said power supply.

18. A system as defined in claim 2, 3 or 7 further comprising polarity-changing means operable to reverse the connection between said input diagonal and said voltage intensifier upon a changeover between a heating and a cooling mode of said equipment.

19. A system as defined in claim 2, 3 or 7 further comprising a potentiometer connected across said input diagonal and provided with a tap connected to a corner of said impedance bridge for setting said temperature threshold.

* * * * *